Patented Feb. 26, 1924.

1,484,970

UNITED STATES PATENT OFFICE.

ADOLPH SHERER, OF BROOKLYN, NEW YORK.

PROCESS OF MAKING SOUP POWDER FROM PEAS, BEANS, LENTILS, OR THE LIKE.

No Drawing.     Application filed April 7, 1922. Serial No. 550,473.

*To all whom it may concern:*

Be it known that I, ADOLPH SHERER, a citizen of the United States, and a resident of Brooklyn, in the county of Kings and State of New York, have invented new and useful Improvements in Processes of Making Soup Powder from Peas, Beans, Lentils, or the like, of which the following is a specification.

The objects of this invention are to reduce dried peas, beans, lentils or the like to a dry pulverized form in which they have been completely cooked, so that by the addition of hot water a soup may be instantly prepared ready for consumption; to avoid the necessity for any cooking upon the addition of the hot water, and thus enable the soup to be instantly prepared; to secure such a powder in which cooking of the substance or ingredients has been completely performed, so that the soup will be palatable and digestible; to effect said cooking easily and perfectly, and to obtain other advantages and results as may be brought out by the following description.

In carrying out my invention I use the peas, beans, lentils or the like, in ordinary and well-known dried form, and therefore it is first necessary to soak them in water to soften them and restore their plumpness. Such soaking may be done in any suitable manner, as for example by soaking them in cold water from twelve to eighteen hours, depending upon their degree of dryness.

When such soaking is properly accomplished, the peas, beans, lentils or the like are removed from the water, but with some water or moisture adhering thereto, and are immersed in a fatty or oleaginous material, heated to a temperature sufficient to cook them in the water or moisture which they carry. I have found that a temperature somewhat above the boiling point of water is preferable, having it sufficiently higher than the boiling point of water so that the immersion of the peas, beans, lentils, or the like, to be cooked, will not cause the temperature to fall below the boiling point of water. A temperature of 300 Fahr. has been found satisfactory.

Of course the temperature can be maintained by applying heat in any ordinary and well-known manner, and the peas or the like are preferably immersed in a container of some sort which will hold them together and yet permit access of the heated fatty or oleaginous material through their bulk. I have used for this purpose a metal strainer or basket with apertures or interstices in its walls, but obviously anything suitable for the purposes may be employed.

The heat vaporizes the water or moisture of the peas or the like, and they must carry enough such water or moisture to cook them thoroughly and completely. Such water or moisture, in the form of steam, ultimately escapes upward through the hot fatty or oleaginous material and appears at the surface thereof in the form of bubbles. As the water or moisture thus evaporates, the fatty or oleaginous material is gradually increased in temperature, until when about 265 or 275 degrees Fahrenheit is reached the peas, beans, lentils or the like will have become completely cooked and hardened and shrunk to about the same size they were before they were soaked.

They are then removed from the fatty or oleaginous material, in their container, and the fatty or oleaginous material adhering to them is removed in any suitable way, as by a centrifugal machine, leaving the peas or the like dry in a perfectly and completely cooked condition. They are then preferably ground to a powder and packaged.

In using the powder, all that is necessary is to add hot water and stir thoroughly, to instantly secure a soup, and such soup will be perfectly cooked and ready for consumption. By my improved process I therefore secure from peas, beans, lentils and the like, a powder from which a soup can be made instantly without any necessity for cooking or the delay occasioned thereby.

If it is desired to secure a soup powder with increased fat content, the drying of the peas, beans, lentils or the like, after their removal from the hot fatty or oleaginous material, is not carried so far but that some of said fatty or oleaginous material is left on them, as may be desired, and they are ground or pulverized in that condition. The moisture or steam escaping from the peas, beans, lentils or the like, in cooking, prevents absorption of the fatty or oleaginous material, but by varying the drying of them after removal from said material, as just explained, any desired fat content of the soup can be obtained and the taste and food value of the soup greatly improved.

Care should be taken, in carrying out my invention, not to exceed materially the cooking temperature which I have set forth, and especially not to employ a frying temperature, which would render it difficult to get the cooked peas or the like out of the oleaginous material before it had a frying effect on them. The temperature of the oleaginous material should be such that it will be well above the boiling point of water when the peas or the like are immersed and at the same time well below a frying temperature, so that when the peas or the like are removed, upon the cessation of bubbling, they will be only steam-cooked. In this condition they will be of their natural color, and dry so that they will readily pulverize into the desired powder.

Having thus described the invention, what I claim is:

1. The hereindescribed process of making a soup powder from peas, beans, lentils or the like, which consists in immersing them in moist condition in a heated oleaginous material until the moisture is driven off, removing them from said oleaginous material as soon as said moisture is driven off, and pulverizing them.

2. The hereindescribed process of making a soup powder from peas, beans, lentils or the like, which consists in immersing them in a moist condition in an oleaginous material above the boiling point of water and below a frying temperature until cooked, removing them from said oleaginous material, and pulverizing them.

3. The hereindescribed process of making a soup powder from peas, beans, lentils or the like, which consists in immersing them in a moist condition in an oleaginous material above the boiling point of water and below 275 degrees Fahr. until cooked, removing them from said oleaginous material, and pulverizing them.

ADOLPH SHERER.